(12) United States Patent  
Samson (10) Patent No.: US 7,526,733 B1  
(45) Date of Patent: Apr. 28, 2009

(54) VISUAL WATERMARK

(75) Inventor: Peter R. Samson, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 1404 days.

(21) Appl. No.: 10/226,039

(22) Filed: Aug. 21, 2002

(51) Int. Cl.
*G06F 3/00* (2006.01)
*G06F 9/00* (2006.01)
*G06F 17/00* (2006.01)

(52) U.S. Cl. ............... 715/805; 715/804; 715/781; 715/764

(58) Field of Classification Search ........... 715/805
See application file for complete search history.

(56) References Cited

U.S. PATENT DOCUMENTS 6,795,565 B2 * 9/2004 Wendt ............... 382/100

2003/0219144 A1 * 11/2003 Rhoads et al. ............. 382/100
2003/0231785 A1 * 12/2003 Rhoads et al. ............. 382/100

FOREIGN PATENT DOCUMENTS

EP           982930 A2 *   3/2000

* cited by examiner

*Primary Examiner*—Dennis-Doon Chow
*Assistant Examiner*—Sabrina L. Greene
(74) *Attorney, Agent, or Firm*—Patterson & Sheridan, LLP (57) ABSTRACT

Techniques are provided for establishing an association between a code and a user. Before a software product is provided to the user, the code is stored within the software product. The software product is configured to convert the code into a visual watermark, which is displayed on at least one screen image generated by the software product. Techniques are also provided for identifying a visual watermark in a screen image and decoding the visual watermark into a corresponding code. The user associated with the code can then be identified.

21 Claims, 6 Drawing Sheets

VISUAL WATERMARK

TECHNICAL FIELD

The systems and methods described herein relate to visual watermarks and, more particularly, to systems and methods that create, display, analyze and decode visual watermarks.

BACKGROUND

Existing products and techniques are available for preventing the unauthorized distribution or copying of software products, such as computer programs. Various types of locking schemes using software locks and/or hardware locks prevent users from making unauthorized copies of an application program. Such locking schemes are useful for both released application programs (i.e., available for purchase by the general public) as well as unreleased application programs, such as alpha and beta versions of an application program.

However, these locking schemes do not prevent a user from distributing information about the application program, such as copies of screen images generated by the application program (commonly referred to as "screen shots"). Companies developing new application programs may desire to protect their screen shots prior to release of the program to avoid giving competitors a "head-start" in creating a similar application program. Although alpha and beta testers of an application program often sign an agreement not to disclose information about the application program being tested (including screen shots), existing locking schemes do not prevent a user of the application program from distributing screen shots via the Internet or any other communication channel. Further, these locking schemes do not provide a mechanism for determining which user was responsible for distributing one or more screen shots in violation of an agreement not to distribute such information.

It is therefore desirable to provide a system that allows an organization developing an application program to determine the user or entity responsible for unauthorized distribution of screen shots.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION

The systems and methods described herein allow an organization to determine the user or entity that distributed screen shots from an application program or other source. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Particular examples are described herein with reference to application programs or other software products that generate screen images (also referred to as "screen shots"). However, the systems and methods described herein can be applied to any screen image generated by any type of application program or other process. For example, screen images may be web pages generated by one or more web servers, saved copies of screen images previously captured while displayed on a computer monitor or other display device, or printed copies of screen images previously displayed on a display device.

As used herein, a "software product" is any set of instructions executable by a processor. Software products may include anything from individual routines and modules to entire applications and systems. For the purpose of explanation, embodiments are described herein such that the software product is an application program.

Creating a Visual Watermark

Figure 1:
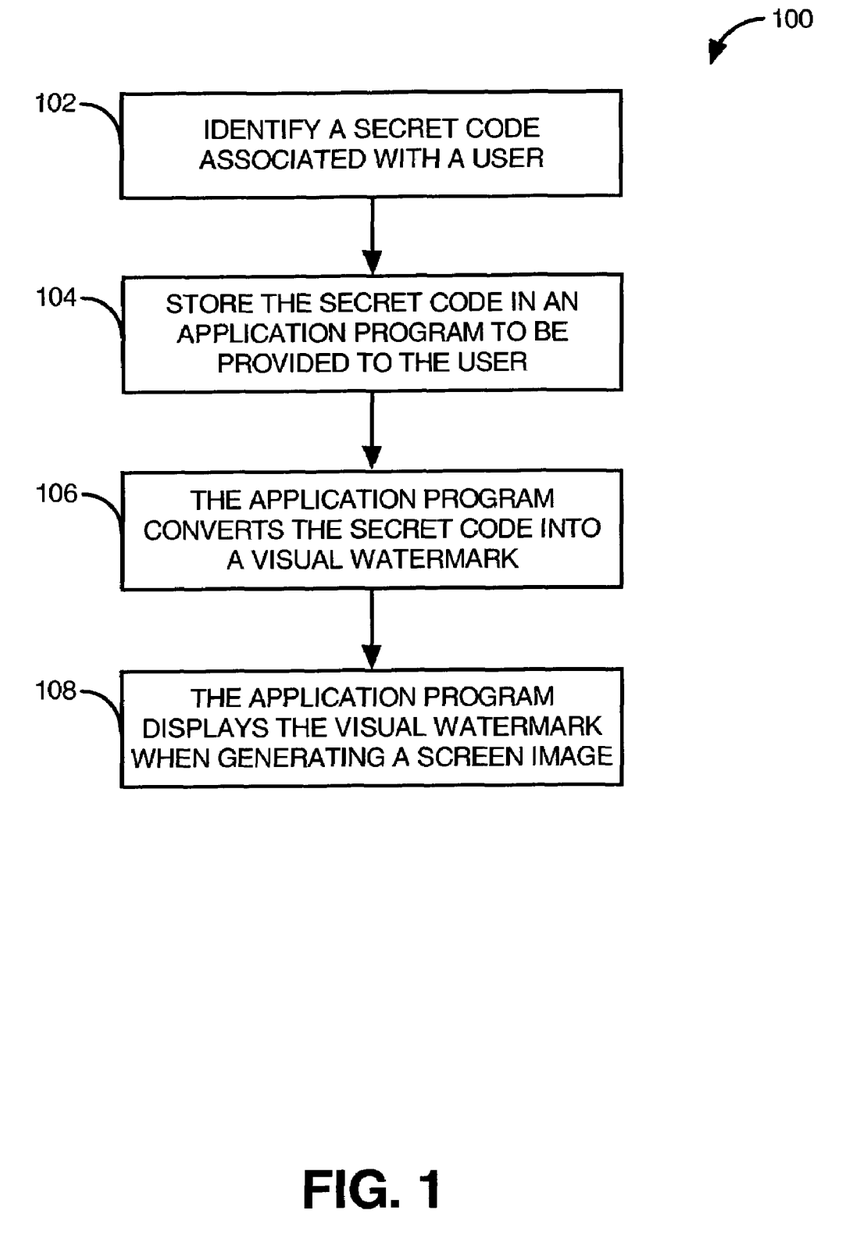
FIG. 1 is a flow diagram illustrating a procedure for creating and encoding a visual watermark in a screen image.

FIG. 1 is a flow diagram illustrating a procedure (100) for creating and encoding a visual watermark in a screen image. A visual watermark is a graphical representation of a secret code, discussed below. The visual watermark can be any collection of spots, blocks, bars, lines, or other graphical segments in various colors, patterns, or grayscale levels, or transparency levels. The visual watermark may be included in a screen generated by an application program, in a web page, in a hardcopy of a screen image, or any other display device.

Initially, the procedure 100 identifies a secret code associated with a user (block 102). The secret code is unique to the user and may contain any number of digits (also referred to as "characters"). In a particular embodiment, each secret code contains 48 hexadecimal digits. The secret code may be associated with a particular individual or an organization or other entity. The code is referred to as "secret" because it is not generally provided to or disclosed to the user. Typically, the secret code is only known by the developer of the application program. However, in alternate embodiments, a non-secret code (i.e., a code that is disclosed or otherwise made available to the user) is used instead of a secret code. In these alternate embodiment, the systems and methods described herein operate in the same manner.

The procedure stores the secret code in an application program to be provided to the user (block 104). For example, the secret code may be stored (or embedded) in an alpha version or a beta version of an application program being provided to the user for testing and/or evaluation. Alpha versions and beta versions of the application program represent two types of non-public versions of the application program. These non-public versions of the application program are distributed to particular users or organizations prior to the general release of the application program.

During execution of the application program, the program converts the secret code into a visual watermark (block 106). Additional details regarding the visual watermark and the manner in which the secret code is converted into a visual watermark are discussed below. The application program then displays the visual watermark when generating a screen image (block 108). In one embodiment, the application program displays the visual watermark on every screen image generated by the application program. In alternate embodiments, the visual watermark is displayed on selected screen images (e.g., those that are most important to the developer of the application program).

A single visual watermark may be displayed on a screen image or multiple copies of the same visual watermark may be displayed at different locations on the screen image. In a particular embodiment, visual watermarks are positioned on the screen image such that they provide little or no interference with the normal use of the application program. Thus, a visual watermark is not typically positioned in a portion of a screen image where it is likely to interfere with the display of other information by the application program. In particular embodiments, the visual watermark is created such that the various elements of the watermark are still visible after being compressed, for example, by a video compression algorithm. As discussed herein, blocks of color represented by four pixels are typically large enough to remain visible after processing by a video compression algorithm.

Figure 2:
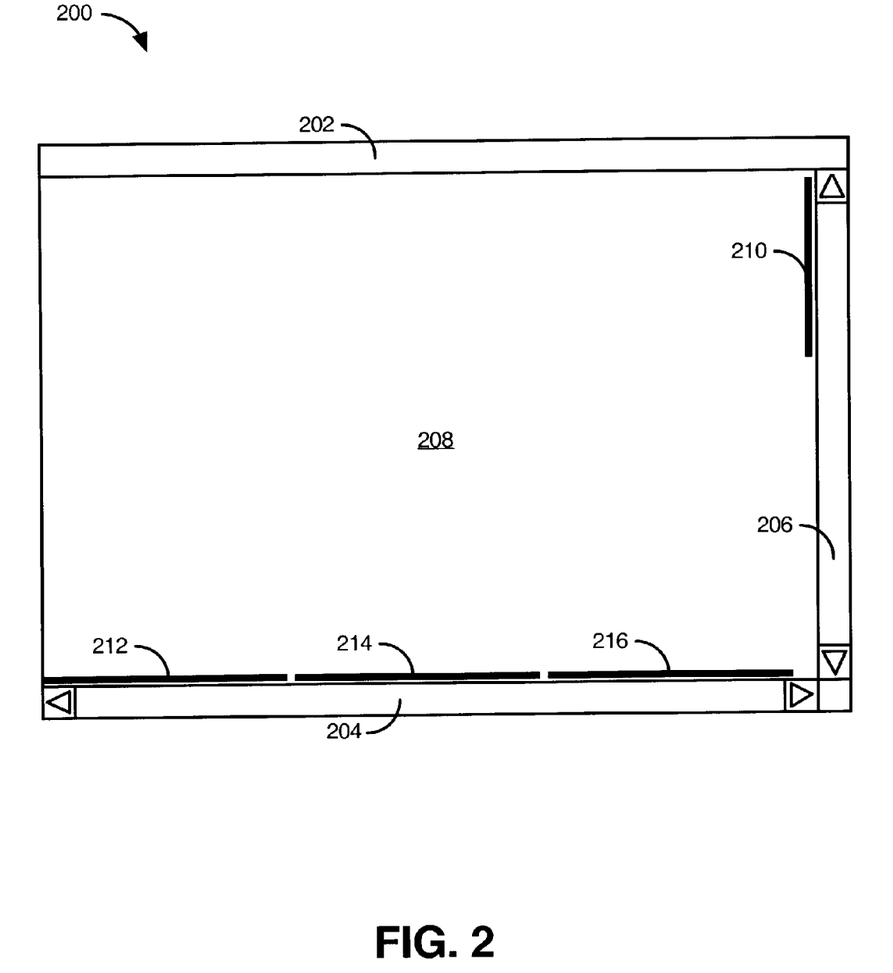
FIG. 2 illustrates an example screen image containing visual watermarks in different locations.

FIG. 2 illustrates an example screen image 200 containing visual watermarks in different locations. Screen image 200 includes a menu bar 202 that may contains any number of menu options, menu icons, or other information. A pair of scroll bars 204 and 206 allow the user to change the information displayed in a main portion of the screen 208 by scrolling the information horizontally and/or vertically. A first visual watermark 210 is positioned vertically along the side of vertical scroll bar 206. Three other visual watermarks 212, 214 and 216 are positioned horizontally just above horizontal scroll bar 204. The three visual watermarks 212, 214 and 216 may represent three copies of the same visual watermark. Displaying multiple copies of the same visual watermark can be useful if a portion of one or more visual watermarks is blocked by the information displayed in the main portion of the screen 208. In a particular embodiment, one or more visual watermarks may be positioned within the scroll bars 204 and/or 206. When positioning one or more visual watermarks on a screen image, it is generally desirable to position the visual watermarks in an unobtrusive manner so as not to interfere with the information being displayed in the main portion of the screen 208.

In alternate embodiments, any number of copies of the same visual watermark can be positioned at various locations on the screen image. In other embodiments, any number of different visual watermarks can be positioned on a screen image.

Analyzing a Visual Watermark

Figure 3:
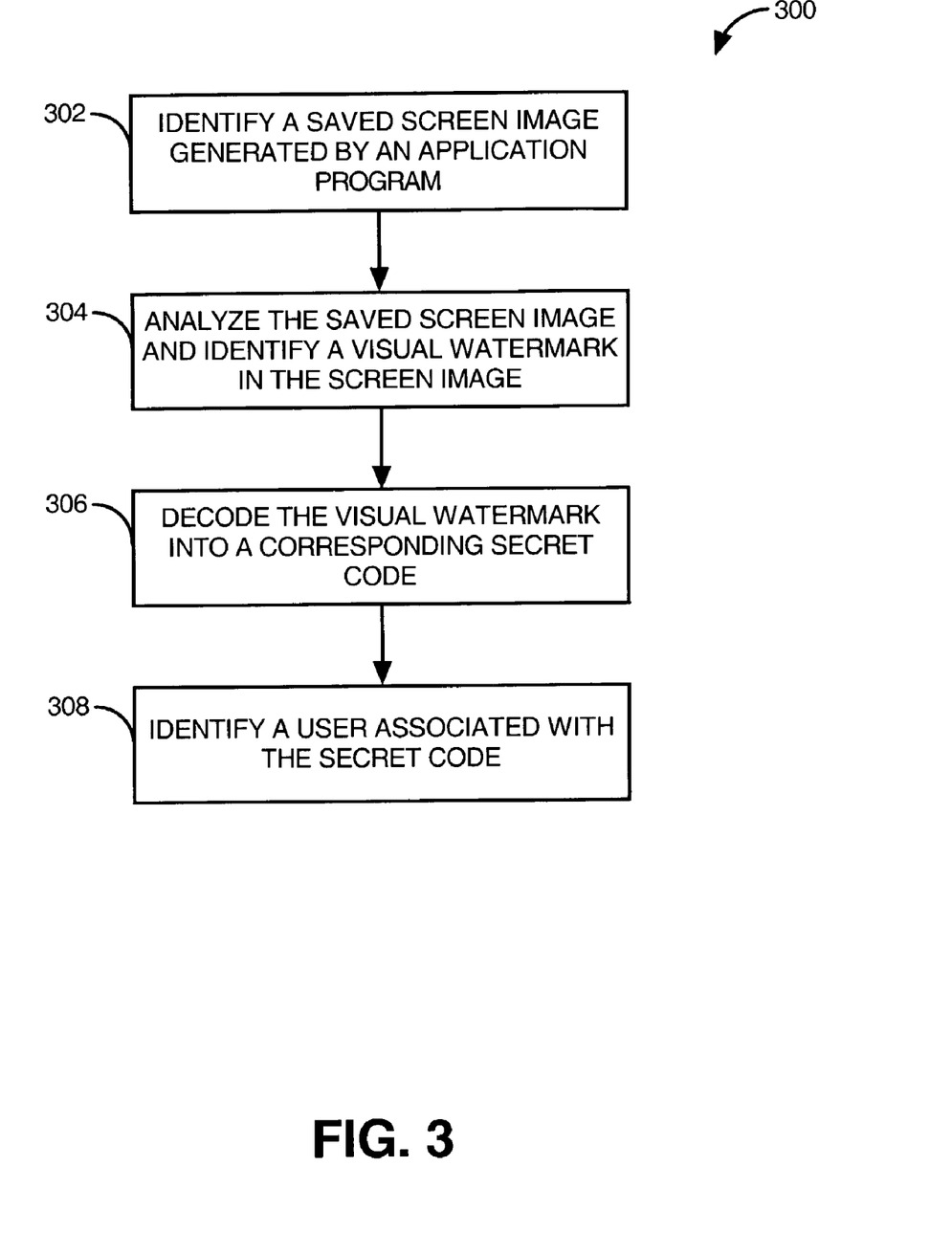
FIG. 3 is a flow diagram illustrating a procedure for identifying and analyzing a visual watermark in a screen image to determine the user that generated the screen image.

FIG. 3 is a flow diagram illustrating a procedure 300 for identifying and analyzing a visual watermark in a screen image to determine the user that generated the screen image. Initially, the procedure 300 identifies a saved screen image generated by an application program (block 302). The saved screen image may be received via any number of sources, such as via an email message, downloaded from a web site or computer bulletin board system, or on a computer-readable media. The saved screen image may be stored in a variety of different formats, such as a bitmap format, a compressed video format (e.g., JPEG) and the like.

After identifying a saved screen image, the procedure 300 analyzes the saved screen image and identifies a visual watermark in the screen image (block 304). When analyzing the saved screen image, the procedure searches the image for visual watermarks of the type or format that are created by the application program that generated the screen image. In one embodiment, visual watermarks are identified based on their known spatial relationship to one or more objects or elements in the screen image. After identifying a visual watermark, its clarity may be increased, for example, by increasing the color saturation and/or overlapping and averaging multiple instances of the visual watermark, thereby averaging out artifacts and other irregularities that can affect the appearance of the visual watermark.

Procedure 200 then decodes the visual watermark into a corresponding secret code (block 306). This secret code is the same as the secret code discussed above with respect to FIG. 1. The procedure then uses the secret code to identify a user associated with the secret code (block 308). The application program provided to the identified user is the application program that generated the saved screen image. Exemplary visual watermarks and encoding/decoding tables are discussed below.

The procedure illustrated in FIG. 3 is particularly useful in situations where an application program is released to a small group of users for testing and/or evaluation purposes and those users have agreed not to disclose any information (including screen shots) relating to the application program. Although the visual watermark may not prevent a user from distributing a screen shot from the application program, it allows the developer of the application program to identify the user that distributed the screen shot and take appropriate actions to prevent similar activities in the future.

Example Watermark

Figure 4:
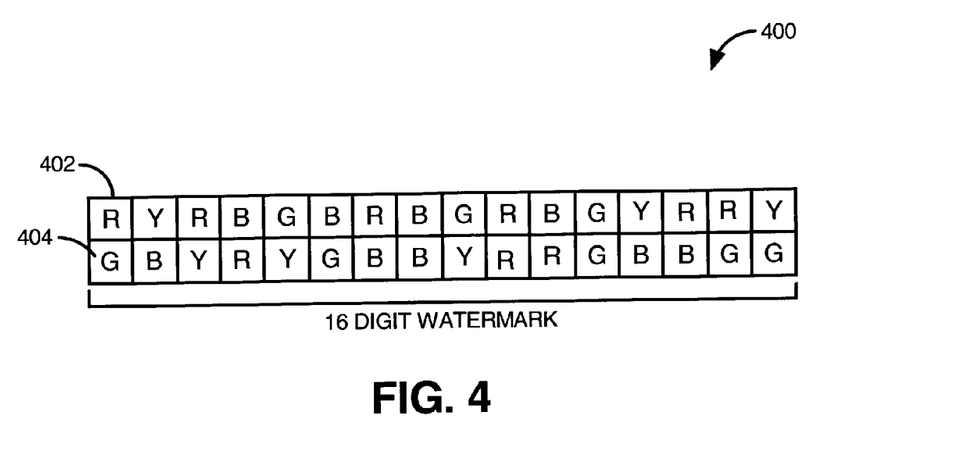
FIG. 4 illustrates an example visual watermark generated from a 16 digit secret code.

FIG. 4 illustrates an example visual watermark 400 generated from a 16 digit secret code. Each "digit" of the visual watermark contains a pair of color blocks (also referred to as color segments), such as blocks 402 and 404. There are four possible colors for each block 402 and 404—red (R), green (G), blue (B), or yellow (Y). Thus, there are sixteen different combinations of colors for each pair of blocks 402, 404. The number of pairs of color blocks corresponds to the number of digits in the secret code associated with the visual watermark. Although FIG. 4 illustrates visual watermark 400 with 16 pairs of color blocks, a particular visual watermark (and a corresponding secret code) can contain any number of pairs of color blocks (and corresponding digits).

In example visual watermark 400, the first pair of colors is red (block 402) over green (block 404), abbreviated as red/green or R/G. The next pair of colors is yellow/blue or Y/B, followed by red/yellow and so on. In a particular embodiment, each color block 402, 404 represents four pixels of the same color that form a two-pixel-by-two-pixel color block. Alternate embodiments may utilize color blocks with any number of pixels in each color block. Additionally, other embodiments may use color blocks of any shape, orientation, and/or arrangement. For example, multiple color blocks may be arranged horizontally (as shown in FIG. 3), vertically, or at various angles (e.g., diagonally).

When creating a visual watermark from a secret code, an encoding table is used to convert secret code digits into visual watermark elements. An encoding table may also be referred to as a "decoding table".

Figure 5:
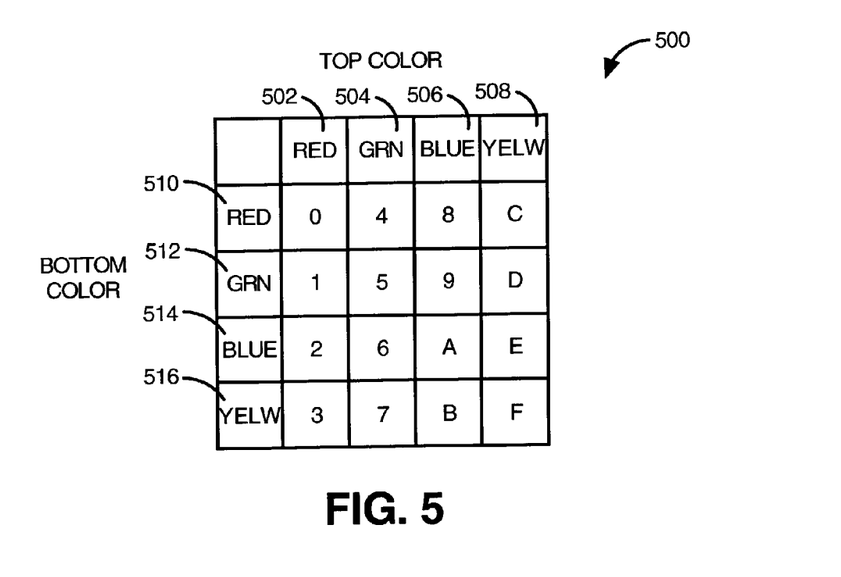
FIG. 5 illustrates an exemplary table used to convert a secret code into a visual watermark and vice versa.

FIG. 5 illustrates an exemplary encoding/decoding table 500 used to convert a secret code into a visual watermark. Encoding/decoding table 500 may also be used as a decoding table to convert a visual watermark into a secret code. Encoding/decoding table 500 includes four columns 502, 504, 506 and 508, and four rows 510, 512, 514 and 516. Each column 502-508 and each row 510-516 has an associated color. The four columns 502-508 represent the top color of the visual watermark and the four rows 510-516 represent the bottom color of the visual watermark. A particular embodiment may include multiple encoding/decoding tables such that the same secret code can be converted into multiple different visual watermarks.

To create a visual watermark from a secret code, each digit of the secret code is converted into a corresponding pair of color blocks based on the information contained in encoding/decoding table 500. For example, if the first digit of the secret code is "1", then the corresponding color block pair is red/green. Red is identified as the top color by identifying the column (Red) in which "1" is located. Green is identified as the bottom color by identifying the row (Green) in which "1" is located. Similarly, if the next secret code digit is "E", then the corresponding color block pair is yellow/blue. This process continues until all digits of the secret code have been converted into corresponding color block pairs.

To decode a secret code from a visual watermark, each color block pair in the visual watermark is converted into a corresponding secret code digit based on the information contained in encoding/decoding table 500. For example, if the first pair of color blocks in the visual watermark are blue/green, then the corresponding secret code digit is "9". The digit "9" is identified by locating the intersection of the blue column 506 and the green row 512. Similarly, if the next pair of color blocks in the visual watermark is green/yellow, then the corresponding secret code digit is "7". Using encoding/decoding table 500, the example watermark 400 is converted to the following 16 secret code digits: 1E38792A7085E21D.

Once the secret code is determined, a lookup table (or similar mechanism) is used to identify the user and/or the organization associated with the secret code. Table 1 below represents an example of such a lookup table.

TABLE 1

| Secret Code | Organization Name | User Name |
|---|---|---|
| 048E3749AB29C331 | Acme Corp. | Bob |
| 394D4900CF2374B0 | ABC, Inc. | Dave |
| 60FFA8B9C3420126 | Flying S Co. | Richard |
| ... | ... | ... |

In Table 1, each secret code contains sixteen hexadecimal digits. Alternate embodiments may use any number of digits for a secret code. Similarly, any type of numbering system can be used for the secret code digits, such as hexadecimal, decimal, octal, or binary. Additionally, any type of notation (such as alphabetic or alphanumeric) may be utilized to generate the secret code. In particular embodiments, Table 1 contains a column for the secret code and the user name, but does not contain a column for the organization name. In other embodiments, Table 1 contains a column for the secret code and the organization name, but does not contain a column for the user name. In alternate embodiments, Table 1 may contain additional columns.

Although various examples discussed herein refer to visual watermarks having different colors, alternate embodiments may utilize different color intensities or color patterns to distinguish between the different "digits" or "characters" of the visual watermark. Alternatively, different grayscale levels can be used to distinguish between different digits or characters of the visual watermark. In other embodiments, different levels of opacity or transparency are used to distinguish between different digits or characters of the visual watermark.

Figure 6:
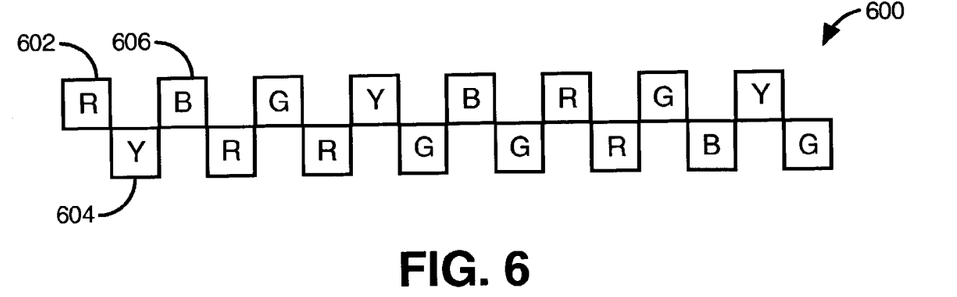
FIGS. 6 and 7 illustrate alternate examples of visual watermarks.
Figure 7:
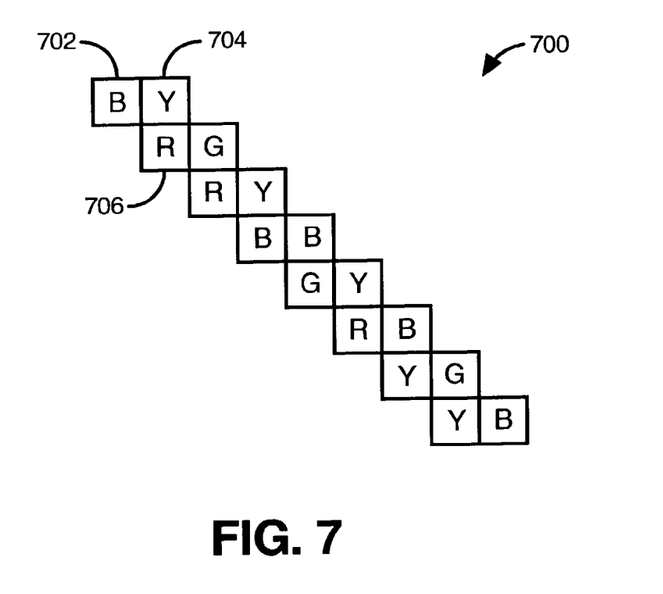

FIGS. 6 and 7 illustrate alternate examples of visual watermarks. Visual watermark 600 shown in FIG. 6 contains an alternating arrangement of color blocks. Each color block may be associated with a particular digit of a corresponding secret code. Alternatively, pairs of color blocks may be associated with a secret code digit. For example, diagonal color blocks, such as color blocks 602 and 604, may form color block pairs associated with secret code digits. Alternatively, adjacent color blocks in the same row, such as color blocks 602 and 606, may form color block pairs associated with secret code digits.

Visual watermark 700 shown in FIG. 7 contains a diagonal arrangement of color blocks. Each color block may be associated with a particular digit of a corresponding secret code or groups of color blocks may be associated with a secret code. For example, horizontally adjacent color blocks, such as color blocks 702 and 704, may form color block pairs associated with secret code digits. Alternatively, vertically adjacent color blocks, such as color blocks 704 and 706, may form color block pairs associated with secret code digits. In another embodiment, each group of three color blocks, such as color blocks 702, 704 and 706, is associated with a secret code digit.

Visual watermarks 600 and 700 represent examples of visual watermarks that can be used to represent a secret code. However, numerous other visual watermarks having different numbers and arrangements of color blocks or other segments may also be utilized to visually represent a secret code.

Hardware Overview

Figure 8:
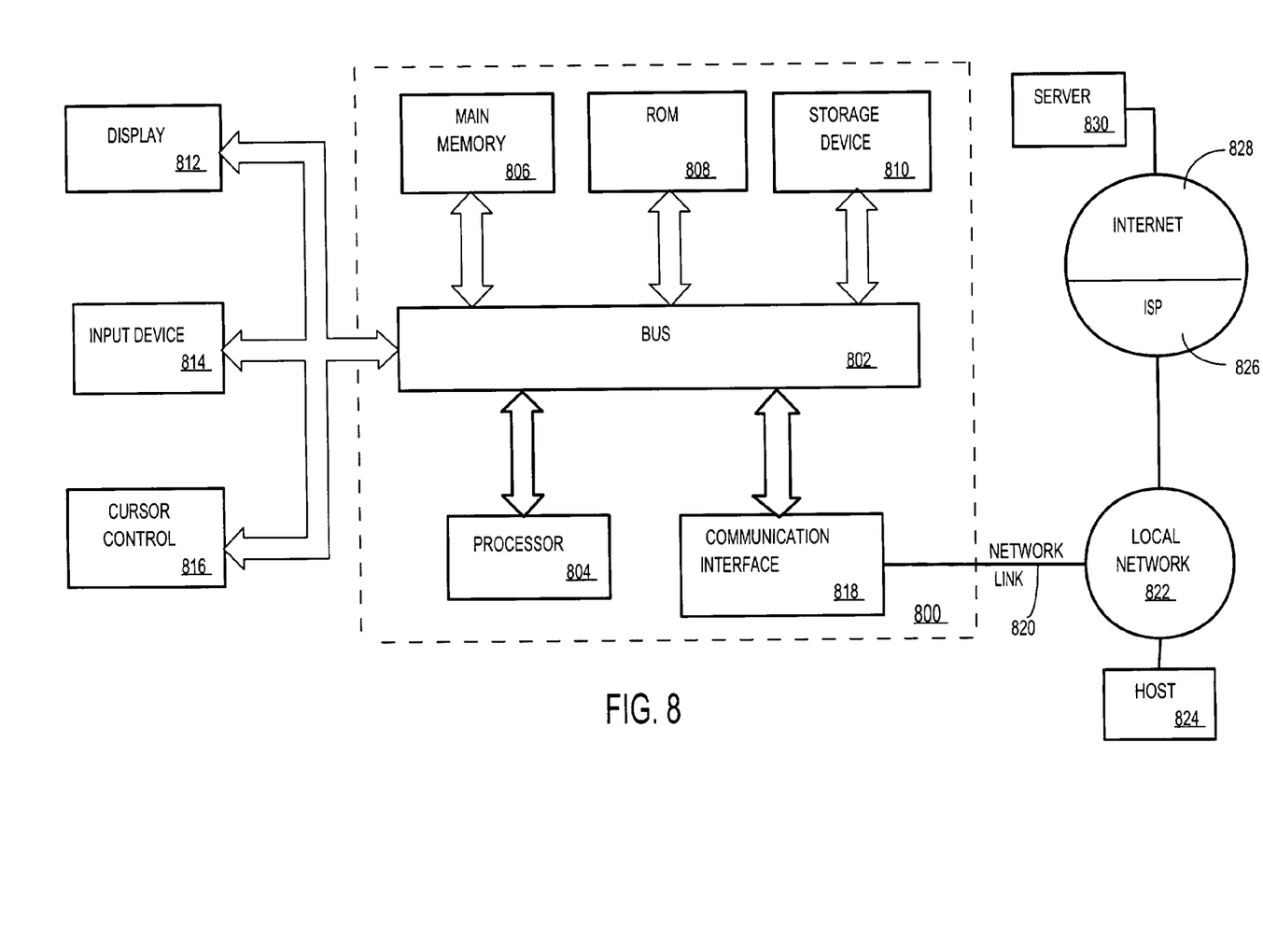
FIG. 8 is a block diagram that illustrates a computer system upon which the procedures discussed herein may be implemented.

FIG. 8 is a block diagram that illustrates a computer system 800 upon which the procedures discussed herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The described systems and methods are related to the use of computer system 800 for implementing various techniques described herein. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hardwired circuitry may be used in place of or in combination with software instructions to implement the systems and methods described herein. Thus, the described systems and methods are not limited to any specific combination of hardware circuitry and software.

The term "computer-readable medium" as used herein refers to any tangible medium that participates in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tap, or any other magnetic medium, a CD ROM or any other optical medium, and a RAM, a PROM, and EPROM, a FLASH-EPROM, or any other memory chip or cartridge.

Any of the various forms of computer-readable media discussed above may be involved in carrying one or more sequences of one or more instructions to processor 804 for execution. For example, the instructions may initially be carried on a magnetic disk of computer system 800. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

What is claimed is:

1. A method comprising:
   establishing an association between a code and a user of a software product; and
   prior to providing the software product to the user, storing the code within the software product, wherein the software product is configured to convert the code into a visual watermark, wherein the visual watermark includes a plurality of pairs of color blocks, wherein each pair of color blocks correspond to one of a plurality of digits in the code associated with the user, and wherein the software product is further configured to display the visual watermark on at least one screen image generated by the software product.

2. The method of claim 1 wherein multiple copies of the visual watermark is displayed in multiple locations on the screen image generated by the software product.

3. The method of claim 1 wherein multiple copies of the visual watermark is displayed on multiple different screen images generated by the software product.

4. The method of claim 1 wherein the visual watermark is unique to the user.

5. The method of claim 1 wherein the visual watermark includes a plurality of color segments that correspond to a plurality of digits in the code associated with the user.

6. The method of claim 1 wherein the visual watermark includes a plurality of grayscale segments that correspond to a plurality of digits in the code associated with the user.

7. The method of claim 1 wherein the visual watermark includes a plurality of segments of varying transparency that correspond to a plurality of digits in the code associated with the user.

8. The method of claim 1 wherein the software product is configured to generate a web page containing the visual watermark.

9. The method of claim 1 wherein the code associated with the user has a plurality of digits.

10. The method of claim 1 wherein the software product is a beta test version of the product.

11. The method of claim 1 wherein the software product is a non-public version of the product.

12. A method comprising:
    identifying a screen image generated, at least in part, by a software product;
    analyzing the screen image to identify a visual watermark generated by the software product in the screen image, wherein the visual watermark includes a plurality of pairs of color blocks, wherein each pair of color blocks correspond to one of a plurality of digits in a code associated with a user;

decoding the visual watermark into a corresponding code; and identifying the user of the software product based on the code.

13. The method of claim 12 further comprising identifying an organization associated with the code.

14. The method of claim 12 wherein the visual watermark is unique to the user.

15. The method of claim 12 wherein the visual watermark includes a plurality of color segments that correspond to a plurality of digits in the code.

16. The method of claim 12 wherein the visual watermark is generated by the software product.

17. The method of claim 12 wherein the software product is a beta version of the software product.

18. A computer-readable storage medium containing one or more sequences of instructions of a software product that, when executed by one or more processors, cause the one or more processors to:

identify a code associated with a user of the software product, wherein the code associated with the user is stored on the computer-readable medium;

convert the code associated with the user into a visual watermark, wherein the visual watermark includes a plurality of pairs of color blocks, wherein each pair of color blocks correspond to one of a plurality of digits in the code associated with the user; and generate at least one screen image containing the visual watermark.

19. The computer-readable storage medium of claim 18 wherein multiple copies of the visual watermark is displayed in multiple locations on the screen image.

20. The computer-readable storage medium of claim 18 wherein the visual watermark includes a plurality of color segments that correspond to a plurality of digits in the code associated with the user.

21. The computer-readable storage medium of claim 18 wherein the one or more processors are further configured to communicate the at least one screen image containing the visual watermark to a display device.

* * * * *